United States Patent
Phan et al.

(10) Patent No.: US 8,783,438 B2
(45) Date of Patent: Jul. 22, 2014

(54) DIVERTER ARM FOR RETAIL CHECKSTAND AND RETAIL CHECKSTANDS AND METHODS INCORPORATING SAME

(71) Applicants: Nhan Thanh Phan, San Antonio, TX (US); Craig Lewis Marquis, Floresville, TX (US); Ronald Andrew Wenzel, San Antonio, TX (US); David Herschel May, Fair Oaks Ranch, TX (US)

(72) Inventors: Nhan Thanh Phan, San Antonio, TX (US); Craig Lewis Marquis, Floresville, TX (US); Ronald Andrew Wenzel, San Antonio, TX (US); David Herschel May, Fair Oaks Ranch, TX (US)

(73) Assignee: HEB Grocery Company, L.P., San Antonio, TX (US)

( * ) Notice: Subject to any disclaimer, the term of this patent is extended or adjusted under 35 U.S.C. 154(b) by 25 days.

(21) Appl. No.: 13/691,204

(22) Filed: Nov. 30, 2012

(65) Prior Publication Data
US 2014/0151187 A1   Jun. 5, 2014

(51) Int. Cl.
*A47F 9/04* (2006.01)
*B65G 47/76* (2006.01)

(52) U.S. Cl.
CPC .............. *B65G 47/76* (2013.01); *B65G 47/766* (2013.01); *B65G 2811/0657* (2013.01); *A47F 9/04* (2013.01); *A47F 9/047* (2013.01)
USPC ........... 198/367; 198/457.05; 186/61; 186/68

(58) Field of Classification Search
CPC ..................... B65G 47/766; B65G 2811/0657; B65G 45/18; A47F 9/047
USPC ........... 198/367–368, 370.07, 457.05, 459.6, 198/459.7, 496; 186/59, 68; 235/383
See application file for complete search history.

(56) References Cited

U.S. PATENT DOCUMENTS

| | | | | |
|---|---|---|---|---|
| 2,569,711 | A | * 10/1951 | Foster | 186/68 |
| 4,706,799 | A | * 11/1987 | Churchland et al. | 198/457.05 |
| 4,939,355 | A | 7/1990 | Rando et al. | 235/467 |
| 5,226,519 | A | 7/1993 | DeWoolfson | 194/209 |
| 5,252,814 | A | 10/1993 | Tooley | 235/383 |
| 5,351,802 | A | * 10/1994 | Wilson | 198/367 |
| 5,426,282 | A | 6/1995 | Humble | 235/383 |
| 5,436,439 | A | 7/1995 | Nishimura et al. | 235/462 |
| 5,494,136 | A | 2/1996 | Humble | 186/61 |
| 5,540,301 | A | 7/1996 | Dumont | 186/61 |
| 5,555,090 | A | 9/1996 | Schmutz | 356/381 |
| RE35,455 | E | * 2/1997 | Sakurai et al. | 186/61 |
| 5,747,784 | A | 5/1998 | Walter et al. | 235/383 |
| 5,821,503 | A | 10/1998 | Witt | 219/388 |
| 5,917,930 | A | 6/1999 | Kayani et al. | 382/135 |

(Continued)

FOREIGN PATENT DOCUMENTS

| CA | 2556778 | 9/2005 |
|---|---|---|
| CA | 2600101 | 2/2008 |

(Continued)

*Primary Examiner* — Mark A Deuble
(74) *Attorney, Agent, or Firm* — Baker Botts L.L.P.

(57) ABSTRACT

A diverter arm of a design that is configured to more effectively direct the movement of items along a retail checkstand, and checkout systems and methods incorporating such a diverter arm, are provided. In one embodiment, the diverter arm comprises an elongated block portion; an upper body portion positioned on top of the block portion substantially along its length, the upper body portion comprising at least a front face; and at least one bristle portion projecting downward from the bottom of the block portion substantially along its length.

26 Claims, 4 Drawing Sheets

(56) References Cited

U.S. PATENT DOCUMENTS

| | | | |
|---|---|---|---|
| 5,979,753 A | 11/1999 | Roslak | 235/380 |
| 5,984,186 A | 11/1999 | Tafoya | 235/462.24 |
| 6,004,091 A | 12/1999 | Roth | 414/263 |
| 6,189,789 B1 | 2/2001 | Levine et al. | 235/383 |
| 6,213,397 B1 | 4/2001 | Rando | 235/454 |
| 6,264,042 B1 | 7/2001 | Cossey, Jr. et al. | 209/559 |
| 6,315,199 B1 | 11/2001 | Ito et al. | 235/383 |
| 6,347,740 B1 | 2/2002 | Bengala | 235/454 |
| 6,360,947 B1 | 3/2002 | Knowles et al. | 235/452.01 |
| 6,363,355 B1 | 3/2002 | Morrison et al. | 705/23 |
| 6,382,515 B1 | 5/2002 | Good et al. | 235/472.01 |
| 6,390,363 B1 | 5/2002 | Morrison et al. | 235/383 |
| 6,471,039 B1 | 10/2002 | Bruun et al. | 198/577 |
| 6,491,218 B2 | 12/2002 | Nguyen | 235/383 |
| 6,497,361 B1 | 12/2002 | Mason | 235/383 |
| 6,517,004 B2 | 2/2003 | Good et al. | 235/472.02 |
| 6,554,189 B1 | 4/2003 | Good et al. | 235/462.01 |
| 6,561,424 B1 | 5/2003 | Dickson et al. | 235/462.01 |
| 6,565,004 B2 | 5/2003 | Ishii et al. | 235/462.25 |
| 6,588,665 B2 | 7/2003 | Knowles et al. | 235/462.01 |
| 6,616,048 B2 | 9/2003 | Good et al. | 235/472.02 |
| 6,622,848 B1 | 9/2003 | Lattimer et al. | 198/418.9 |
| 6,624,396 B2 | 9/2003 | Witt et al. | 219/497 |
| 6,659,344 B2 | 12/2003 | Otto | 235/381 |
| 6,679,694 B1 | 1/2004 | Henschel et al. | 425/83.1 |
| 6,705,528 B2 | 3/2004 | Good et al. | 235/472.01 |
| 6,793,043 B2 | 9/2004 | Nguyen | 186/59 |
| 6,822,182 B2 | 11/2004 | Kechel | 209/584 |
| 6,837,428 B2 | 1/2005 | Lee et al. | 235/383 |
| 6,851,610 B2 | 2/2005 | Knowles et al. | 235/462.01 |
| 6,858,826 B2 | 2/2005 | Mueller et al. | 250/208.1 |
| 6,886,618 B2 | 5/2005 | Foucht et al. | 156/351 |
| 6,923,307 B2 | 8/2005 | Haan et al. | 198/347.4 |
| 6,923,374 B2 | 8/2005 | Knowles et al. | 235/454 |
| 6,935,215 B2 | 8/2005 | Lindee et al. | 83/74 |
| 6,991,066 B2 | 1/2006 | Persky | 186/59 |
| 6,991,167 B2 | 1/2006 | Check et al. | 235/462.14 |
| 6,996,543 B1 | 2/2006 | Coppersmith et al. | 705/50 |
| 7,000,839 B2 | 2/2006 | Good et al. | 235/462.14 |
| 7,007,807 B1 | 3/2006 | Stockard | 209/592 |
| 7,024,378 B2 | 4/2006 | Razumov | 705/26 |
| 7,044,463 B2 | 5/2006 | Brotherston et al. | 270/52.02 |
| 7,048,184 B2 | 5/2006 | Persky | 235/383 |
| 7,056,188 B1 | 6/2006 | Triplett et al. | 451/5 |
| 7,066,389 B2 | 6/2006 | Dickover et al. | 235/383 |
| 7,083,102 B2 | 8/2006 | Good et al. | 235/462.37 |
| 7,086,597 B2 | 8/2006 | Good | 235/462.39 |
| 7,104,453 B1 | 9/2006 | Zhu et al. | 235/462.14 |
| 7,104,454 B2 | 9/2006 | Good et al. | 235/462.24 |
| 7,108,187 B2 | 9/2006 | Turvy et al. | 235/462.08 |
| 7,121,920 B1 | 10/2006 | Triplett et al. | 451/5 |
| 7,128,197 B2 | 10/2006 | Haan et al. | 198/347.4 |
| 7,133,843 B2 | 11/2006 | Hansmann et al. | 705/41 |
| 7,153,203 B2 | 12/2006 | Pfarr et al. | 452/150 |
| 7,159,777 B2 | 1/2007 | Silverbrook et al. | 235/462.01 |
| 7,220,176 B2 | 5/2007 | Hartwick | 452/30 |
| 7,222,738 B1 | 5/2007 | Stockard | 209/552 |
| 7,229,015 B2 | 6/2007 | Persky et al. | 235/383 |
| 7,232,361 B1 | 6/2007 | Triplett et al. | 451/5 |
| 7,248,754 B2 | 7/2007 | Cato | 382/318 |
| 7,261,130 B2 | 8/2007 | Porter et al. | 141/129 |
| 7,275,693 B2 | 10/2007 | Good et al. | 235/462.01 |
| 7,278,551 B2 | 10/2007 | Graf et al. | 222/77 |
| 7,284,347 B2 | 10/2007 | Rodrigues et al. | 40/661 |
| 7,284,749 B2 | 10/2007 | Greene et al. | 270/52.02 |
| 7,314,145 B2 | 1/2008 | Rodrigues et al. | 211/184 |
| 7,331,471 B1 | 2/2008 | Shakes et al. | 209/630 |
| 7,334,729 B2 | 2/2008 | Brewington | 235/383 |
| 7,337,960 B2 | 3/2008 | Ostrowski et al. | 235/383 |
| 7,341,141 B2 | 3/2008 | Spatafora | 198/460.2 |
| 7,341,156 B2 | 3/2008 | Bohlig et al. | 209/592 |
| 7,343,344 B2 | 3/2008 | Tomoike | 705/39 |
| 7,383,996 B2 | 6/2008 | Good et al. | 235/462.17 |
| 7,386,472 B1 | 6/2008 | Bogat | 705/23 |
| 7,387,241 B2 | 6/2008 | Hassenbuerger | 235/383 |
| 7,394,358 B2 | 7/2008 | Cherry | 340/505 |
| 7,428,507 B2 | 9/2008 | Villaret et al. | 705/37 |
| 7,431,143 B2 | 10/2008 | Hanhinen et al. | 198/550.6 |
| 7,434,663 B1 | 10/2008 | Brosnan et al. | 186/68 |
| 7,446,892 B1 | 11/2008 | Churchill et al. | 358/1.15 |
| 7,448,542 B1 | 11/2008 | Bobbitt et al. | 235/383 |
| 7,503,447 B2 | 3/2009 | Ford | 198/370.03 |
| 7,516,818 B2 | 4/2009 | Harris et al. | 186/59 |
| 7,546,250 B1 | 6/2009 | Brosnan et al. | 705/16 |
| 7,580,164 B2 | 8/2009 | Barrus et al. | 358/474 |
| 7,587,879 B2 | 9/2009 | Guttinger et al. | 53/251 |
| 7,600,545 B2 | 10/2009 | Honkanen et al. | 144/382 |
| 7,600,643 B2 | 10/2009 | Georgitis et al. | 209/57 |
| 7,600,705 B2 | 10/2009 | Castronovo | 241/35 |
| 7,621,108 B1 | 11/2009 | Brastauskas et al. | 53/445 |
| 7,634,448 B1 | 12/2009 | Ramachandran | 705/79 |
| 7,644,913 B2 | 1/2010 | Muller | 270/52.16 |
| 7,648,066 B2 | 1/2010 | Kangas et al. | 235/383 |
| 7,686,171 B1 | 3/2010 | Shakes et al. | 209/630 |
| 7,698,977 B2 | 4/2010 | Culling | 83/88 |
| 7,717,251 B2 | 5/2010 | Glas | 198/448 |
| 7,731,595 B2 | 6/2010 | Hlynka | 472/117 |
| 7,778,876 B2 | 8/2010 | Gravelle et al. | 705/17 |
| 7,783,578 B2 | 8/2010 | Mann et al. | 705/64 |
| 7,789,217 B2 | 9/2010 | Fischer et al. | 198/525 |
| 7,798,890 B2 | 9/2010 | Gerrits et al. | 452/53 |
| 7,806,251 B2 | 10/2010 | Noda et al. | 198/601 |
| 7,806,678 B2 * | 10/2010 | Finkowski | 425/215 |
| 7,814,015 B2 | 10/2010 | Benedyk et al. | 705/41 |
| 7,816,617 B2 | 10/2010 | Bennett et al. | 209/584 |
| 7,819,233 B2 | 10/2010 | VanSchaijk et al. | 109/370.09 |
| 7,835,942 B1 | 11/2010 | Pavlic et al. | 705/16 |
| 7,862,021 B2 | 1/2011 | Desfosses | 270/52.16 |
| 7,870,880 B2 | 1/2011 | McGehee et al. | 144/382 |
| 7,883,282 B2 | 2/2011 | Izuchi et al. | 400/76 |
| 7,904,198 B2 | 3/2011 | Hawes | 700/230 |
| 7,909,155 B2 | 3/2011 | Lupton et al. | 198/357 |
| 7,938,272 B2 | 5/2011 | Antilla et al. | 209/247 |
| 7,946,429 B2 | 5/2011 | Kennedy | 209/655 |
| 7,953,606 B2 | 5/2011 | Shirasaki | 705/1.1 |
| 7,968,044 B2 | 6/2011 | Rocha et al. | 266/178 |
| 7,985,939 B2 | 7/2011 | Gillet et al. | 209/584 |
| 8,003,143 B2 | 8/2011 | Taylor | 426/231 |
| 8,005,569 B2 | 8/2011 | Kechel | 700/226 |
| 8,019,365 B2 | 9/2011 | Fisher | 455/466 |
| 8,032,415 B2 | 10/2011 | Sanders et al. | 705/16 |
| 8,034,390 B2 | 10/2011 | Sus et al. | 426/438 |
| 8,047,355 B2 | 11/2011 | Ricciardi, Sr. et al. | 198/806 |
| 8,050,795 B2 | 11/2011 | Dollens | 700/230 |
| 8,056,255 B2 | 11/2011 | Smith et al. | 34/214 |
| 8,073,599 B2 | 12/2011 | Goering et al. | 701/50 |
| 8,132,661 B2 | 3/2012 | Van Schaijk et al. | 198/370.09 |
| 2002/0060129 A1 | 5/2002 | Cooper et al. | 198/443 |
| 2002/0113365 A1 | 8/2002 | Britton et al. | 271/303 |
| 2002/0196204 A1 | 12/2002 | Senn et al. | 345/30 |
| 2003/0077153 A1 | 4/2003 | Elliott et al. | 414/281 |
| 2003/0094346 A1 * | 5/2003 | Bonham et al. | 198/370.07 |
| 2003/0233775 A1 | 12/2003 | Klopfer | 40/564 |
| 2004/0013760 A1 | 1/2004 | Graf et al. | 425/371 |
| 2004/0043096 A1 | 3/2004 | Graf et al. | 425/371 |
| 2004/0199427 A1 | 10/2004 | VanderLoo | 705/16 |
| 2005/0029052 A1 | 2/2005 | Nguyen | 186/66 |
| 2005/0060059 A1 | 3/2005 | Klein et al. | 700/213 |
| 2005/0098633 A1 | 5/2005 | Poloniewicz et al. | 235/462.14 |
| 2005/0110638 A1 | 5/2005 | Mohr | 340/5.92 |
| 2005/0149391 A1 | 7/2005 | O'Shea et al. | 705/14 |
| 2005/0228720 A1 | 10/2005 | Pavlic et al. | 705/16 |
| 2005/0229796 A1 | 10/2005 | Miller | 99/537 |
| 2005/0284386 A1 | 12/2005 | Eversole et al. | 119/57.1 |
| 2006/0043175 A1 | 3/2006 | Fu et al. | 235/383 |
| 2006/0109526 A1 | 5/2006 | Zhang et al. | 358/487 |
| 2006/0165060 A1 | 7/2006 | Dua | 370/352 |
| 2006/0181458 A1 | 8/2006 | Niu | 342/463 |
| 2006/0228449 A1 | 10/2006 | Tewari | 426/129 |
| 2007/0063015 A1 | 3/2007 | Mebruer | 235/379 |
| 2007/0090028 A1 | 4/2007 | Varney | 209/584 |
| 2007/0260555 A1 | 11/2007 | Ho et al. | 705/75 |
| 2007/0268778 A1 | 11/2007 | Velsor | 366/7 |
| 2008/0023302 A1 | 1/2008 | Groom | 198/781.06 |

(56) References Cited

U.S. PATENT DOCUMENTS

| | | | |
|---|---|---|---|
| 2008/0086378 A1 | 4/2008 | Reddy | 705/14 |
| 2008/0087724 A1 | 4/2008 | Kobres et al. | 235/383 |
| 2008/0114699 A1 | 5/2008 | Yuan | 705/78 |
| 2008/0121689 A1 | 5/2008 | Good et al. | 234/375 |
| 2008/0154751 A1 | 6/2008 | Miles | 705/28 |
| 2008/0223918 A1 | 9/2008 | Williams | 235/379 |
| 2008/0290006 A1 | 11/2008 | Duffy | 209/630 |
| 2009/0026255 A1 | 1/2009 | Besecker et al. | 235/375 |
| 2009/0090583 A1 | 4/2009 | Bonner et al. | 186/59 |
| 2009/0090584 A1 | 4/2009 | Chakra et al. | 186/61 |
| 2009/0112760 A1 | 4/2009 | Johnson et al. | 705/40 |
| 2009/0134221 A1 | 5/2009 | Zhu et al. | 235/383 |
| 2009/0150248 A1 | 6/2009 | Ling et al. | 705/17 |
| 2009/0192905 A1 | 7/2009 | Oles et al. | 705/17 |
| 2009/0204525 A1 | 8/2009 | Phillips | 705/35 |
| 2009/0214724 A1 | 8/2009 | Gordon et al. | 426/129 |
| 2009/0215394 A1 | 8/2009 | Dewan | 455/41.2 |
| 2009/0240626 A1 | 9/2009 | Hasson | 705/75 |
| 2009/0294248 A1 | 12/2009 | Sudkamp | 198/341.03 |
| 2009/0294560 A1 | 12/2009 | Yamaguchi et al. | 241/33 |
| 2010/0051685 A1 | 3/2010 | Royyuru et al. | 235/379 |
| 2010/0065405 A1 | 3/2010 | Lagneaux | 198/853 |
| 2010/0131347 A1 | 5/2010 | Sartipi | 705/514.33 |
| 2010/0161434 A1 | 6/2010 | Herwig et al. | 705/20 |
| 2010/0211504 A1 | 8/2010 | Aabye et al. | 705/44 |
| 2010/0211507 A1 | 8/2010 | Aabye et al. | 405/71 |
| 2010/0217707 A1 | 8/2010 | Phillips | 705/41 |
| 2010/0235283 A1 | 9/2010 | Gerson | 705/75 |
| 2010/0250381 A1 | 9/2010 | Snyder | 705/21 |
| 2010/0257098 A1 | 10/2010 | Mann et al. | 705/44 |
| 2010/0268612 A1 | 10/2010 | Berrio et al. | 705/16 |
| 2010/0274726 A1 | 10/2010 | Florek et al. | 705/72 |
| 2011/0000764 A1 | 1/2011 | VanSchaijk et al. | 198/367 |
| 2011/0024972 A1 | 2/2011 | Schneider | 271/119 |
| 2011/0035048 A1 | 2/2011 | Mikulec et al. | 700/230 |
| 2011/0042456 A1 | 2/2011 | Masaryk et al. | 235/380 |
| 2011/0056226 A1 | 3/2011 | Okubo et al. | 62/208 |
| 2011/0088996 A1* | 4/2011 | Hoene | 198/349 |
| 2011/0112968 A1 | 5/2011 | Florek et al. | 705/50 |
| 2011/0129296 A1 | 6/2011 | Van Velsor | 404/79 |
| 2011/0184819 A1 | 7/2011 | Mon et al. | 705/16 |
| 2011/0184820 A1 | 7/2011 | Mon et al. | 705/16 |
| 2011/0208600 A1 | 8/2011 | Aharoni et al. | 705/16 |
| 2011/0238512 A1 | 9/2011 | Doty et al. | 705/17 |
| 2011/0250866 A1 | 10/2011 | Fisher | 455/410 |
| 2011/0251892 A1 | 10/2011 | Laracey | 705/14.51 |
| 2011/0259959 A1 | 10/2011 | Knobloch | 235/383 |
| 2011/0266199 A1 | 11/2011 | Barnett et al. | 209/592 |
| 2011/0270764 A1 | 11/2011 | Mizani Oskui | 705/75 |
| 2011/0289004 A1 | 11/2011 | Prakash | 705/71 |
| 2011/0295704 A1 | 12/2011 | Edwards | 705/16 |
| 2013/0062159 A1 | 3/2013 | Fischer | 198/367 |

FOREIGN PATENT DOCUMENTS

| | | |
|---|---|---|
| EP | 01717772 | 11/2006 |
| JP | 04-372098 | 12/1992 |
| JP | 08-290774 | 11/1996 |
| JP | 2007/300572 | 11/2007 |
| WO | 03/075125 | 9/2003 |
| WO | 2007/002941 | 1/2007 |

* cited by examiner

DIVERTER ARM FOR RETAIL CHECKSTAND AND RETAIL CHECKSTANDS AND METHODS INCORPORATING SAME

FIELD OF THE INVENTION

The present disclosure generally relates to apparatus and methods useful in retail checkstands, inventory and warehousing, and other applications that involve processing of a plurality of items. More particularly, the present invention provides a diverter arm of a design that is configured to more effectively direct the movement of items along a retail checkstand, and checkout systems and methods incorporating such a diverter arm.

BACKGROUND

Many retail stores, such as supermarkets, use checkstands that comprise various components configured to identify items in a customer's order, process coupons, accept payment, hold items while a customer's order is being processed, and/or perform other tasks to complete a customer's order. Most checkstands known in the art today comprise one or more computer terminals and/or scanning devices that are able to identify and/or record each item being purchased by a customer, for example, by optically scanning product identification codes (e.g., bar codes) affixed to each items. Once an item has been scanned or identified, in many instances, the item may be placed on a conveyor (e.g., a conveyor belt) that transports the item to another collection area where the items can be bagged and/or held until the customer is ready to remove them before leaving the store. Examples of checkstands that include scanning devices and conveyors that may be utilized in this manner are disclosed in, for example, U.S. Pat. No. 6,491,218 to Nguyen and U.S. Patent Application Publication 2009/0090583 A1 by Bonner, et al.

In some instances, it may be desirable to use a particular computer terminal or scanning device at a checkstand to identify and/or record items in a customer's order before the previous customer's items have been bagged or removed by the customer, for example, during periods of high customer volume, in stores having a limited number of checkstands, and/or in a number of other circumstances. However, if items purchased by one customer are scanned and placed on the conveyor while a previous customer's items are still being held in the collection area at the end of that conveyor, those new items coming into the collection area may become intermingled with the previous customer's items. This may, among other problems, complicate bagging of each customer's items and/or create confusion when the customers attempt to remove their respectively purchased items from the collection area.

Moreover, if a collection area is full and there is no room for additional items in that collection area, subsequent items placed on the conveyor (whether belonging to that customer or a subsequent customer) may be pushed against items already in the collection area as the conveyor transports them. Soft or fragile items (e.g., bread, eggs, etc.) may be squeezed, broken, or otherwise damaged by the force of other items being pushed against them in these circumstances.

The attendant or user at the checkstand may stop the conveyor in order to prevent items from becoming intermingled and/or damaged as discussed above. However, this may cause a backlog of items on the conveyor, which may, among other problems, require the attendant or user to stop scanning items and/or rearrange items to make room for additional items, thereby reducing the efficiency of the checkout process.

Therefore, what is needed is an apparatus or system for effectively directing the movement of items along one or more conveyors in a retail checkstand without causing damage to certain types of items.

SUMMARY

The present disclosure generally relates to apparatus and methods useful in retail checkstands, inventory and warehousing, and other applications that involve processing of a plurality of items. More particularly, the present invention provides a diverter arm of a design that is configured to more effectively direct the movement of items along a retail checkstand, and checkout systems and methods incorporating such a diverter arm.

In one embodiment, the present disclosure provides a diverter arm comprising: an elongated block portion; an upper body portion positioned on top of the block portion substantially along its length, the upper body portion comprising at least a front face; and at least one bristle portion projecting downward from the bottom of the block portion substantially along its length.

In another embodiment, the present disclosure provides a retail checkstand comprising: a conveyor configured to receive items; one or more item collection areas proximate to an end of the conveyor; one or more diverter arms positioned between a portion of the conveyor and one or more of the item collection areas, wherein the diverter arm comprises an elongated block portion, an upper body portion positioned on top of the block portion substantially along its length, the upper body portion comprising at least a front face, and at least one bristle portion projecting downward from the bottom of the block portion substantially along its length.

In another embodiment, the present disclosure provides a method of performing retail checkout comprising: providing a retail checkstand comprising a conveyor configured to receive items; at least first and second item collection areas proximate to an end of the conveyor; one or more diverter arms positioned between a portion of the conveyor and one or more of the item collection areas, wherein the diverter arm comprises an elongated block portion, an upper body portion positioned on top of the block portion substantially along its length, the upper body portion comprising at least a front face, and at least one bristle portion projecting downward from the bottom of the block portion substantially along its length; positioning one or more of the diverter arms in a first position in which items are permitted to pass from the conveyor to a first collection area but not to a second collection area; and positioning one or more of the diverter arms in a second position in which items are permitted to pass from the conveyor to the second collection area but not to the first collection area.

The features and advantages of the present invention will be apparent to those skilled in the art. While numerous changes may be made by those skilled in the art, such changes are within the spirit of the invention.

DRAWINGS

Some specific example embodiments of the disclosure may be understood by referring, in part, to the following description and the accompanying drawings.

Figure 1:
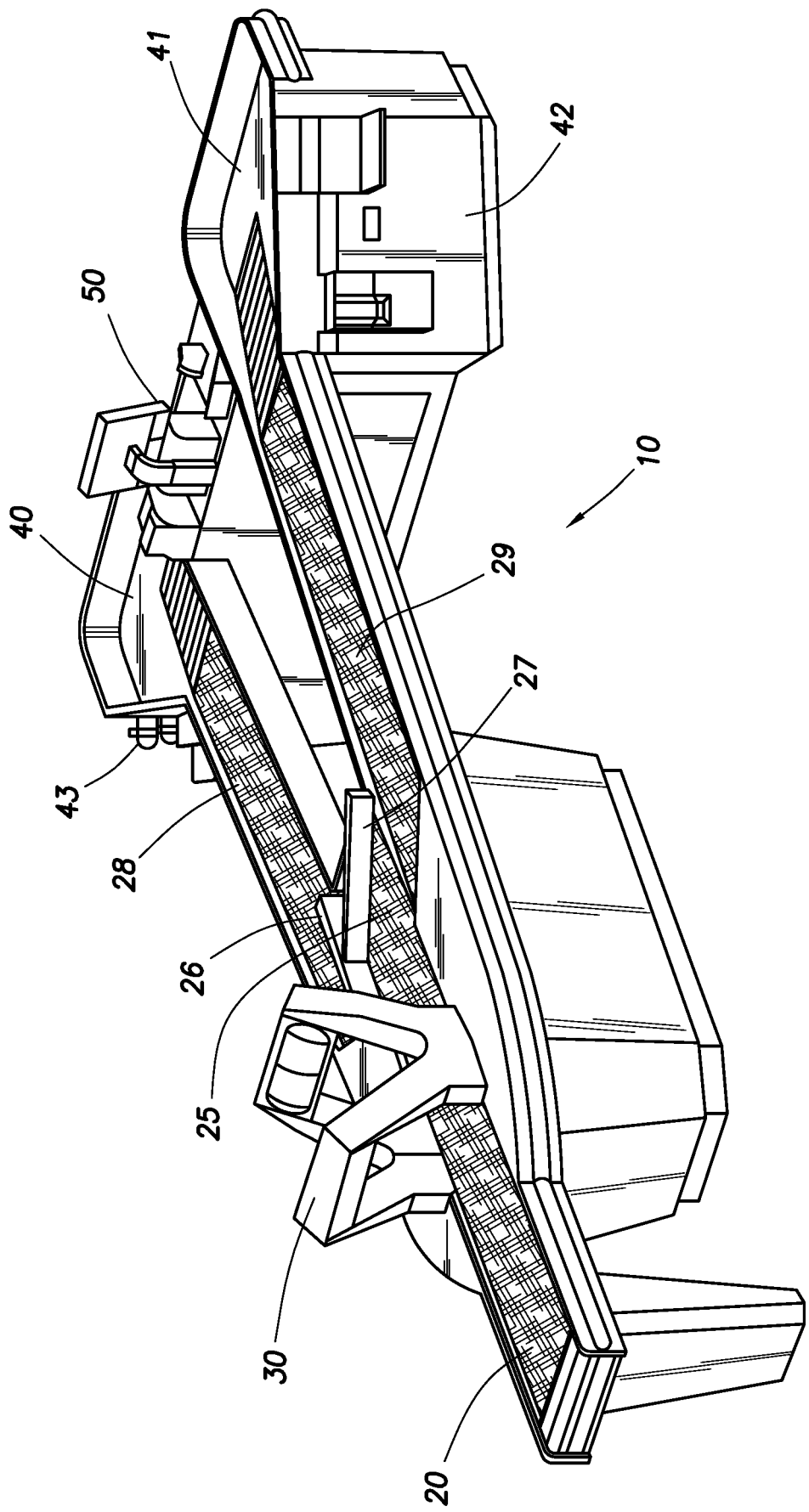
FIG. 1 depicts a checkstand for use in a retail store, according to one embodiment of the present disclosure.

While the present disclosure is susceptible to various modifications and alternative forms, specific example embodiments have been shown in the figures and are herein described in more detail. It should be understood, however, that the description of specific example embodiments is not intended to limit the invention to the particular forms disclosed, but on the contrary, this disclosure is to cover all modifications and equivalents as illustrated, in part, by the appended claims.

DESCRIPTION

The present disclosure generally relates to apparatus and methods useful in retail checkstands, inventory and warehousing, and other applications that involve processing of a plurality of items. More particularly, the present invention provides a diverter arm of a design that is configured to more effectively direct the movement of items along a retail checkstand, and checkout systems and methods incorporating such a diverter arm.

More particularly, the present disclosure provides a diverter arm comprising at least an elongated block portion, an upper body portion positioned on top of the block portion substantially along its length, and at least one bristle portion projecting downward from the bottom of the block portion substantially along its length. In some embodiments, the diverter arm may be placed in one or more positions in order to selectively direct retail items to one of a plurality of collection areas adjacent to a conveyor. The design of the diverter arm of the present invention may, among other benefits, allow the diverter arm to more effectively direct the movement of retail items of different shapes and sizes from a conveyor to a collection area without causing the items to be squeezed, damaged, or caught in the diverter arm or other components of the checkstand. In some embodiments, the upper body portion, block portion, bristle portion, and/or other components of the diverter arm of the present invention may be individual parts that are detachably attached to each other, which may, among other benefits, facilitate repair, replacement, and/or cleaning of certain components of the diverter arm.

It should be appreciated that the diverter arms, checkout systems, and methods of the present invention disclosed herein may be used in conjunction with any checkstand of any configuration that includes at least one conveyor and one or more collection areas, including but not limited to conventional checkstands known in the art. Examples of such checkstands include attendant-operated checkstands, customer-operated checkstands (i.e., "self-checkout" systems), checkstands incorporating "tunnel scanners", and the like.

1. Checkstand Components and Operation

In one embodiment, the present disclosure provides a retail checkstand for use for use in a retail store, such as a supermarket, that includes at least one diverter arm of the present invention. While there are various known and suitable checkstand configurations, a particularly suitable configuration for a checkstand of the present disclosure generally comprises a multi-item identification device (e.g., a multi-item scanner), one or more conveyors, and one or more collection areas located at the end of at least one of the conveyors. Retail checkstands of the present invention also may comprise one or more computer terminals, one or more theft mitigation devices, as well as other components commonly associated with checkstands and checkout systems. An example of one configuration for a suitable checkstand 10 is depicted in FIG. 1 and will be discussed in further detail below.

Referring now to FIG. 1, in a typical mode of operation, a customer may bring the items they desire to purchase to a checkstand 10 and place the items on an intake conveyor 20 (e.g., a conveyor belt) that moves the items toward a multi-item scanner 30 positioned at the end of intake conveyor 20. The items are then scanned and/or imaged by the multi-item scanner 30 and subsequently moved onto a transition conveyor 25, a first end of which is arranged adjacent to the end of intake conveyor 20 near the multi-item scanner 30.

The checkstand 10 shown in FIG. 1 also includes two outtake conveyors 28 and 29 having a first end arranged to receive items from the transition conveyor 25. Collection areas 40 and 41 are arranged adjacent to the other ends of outtake conveyors 28 and 29 to receive items from its respective outtake conveyor. Collection areas 40 and 41 may include racks designed to hold bags or sacks into which items may be placed, either automatically or by a customer or store employee. In some embodiments, collection areas may comprise additional conveyors (e.g., belts, rollers, etc.) and/or downwardly-sloping surfaces that are configured to move (or facilitate the movement of) items to yet another location or position.

Diverter arms 26 and 27 are located near the end of transition conveyor 25 adjacent to the outtake conveyors 28 and 29. In this embodiment, diverter arms 26 and 27 may be positioned to selectively allow items on transition conveyor 25 to pass to only one of outtake conveyor 29 (when in the positions shown in FIG. 1) or outtake conveyor 28. The diverter arms 26 and 27 may be arranged and/or mounted at a checkstand of the present disclosure in any configuration using any means known in the art. In the embodiment shown in FIG. 1, the diverter arms 26 and 27 are pivotally mounted at the checkstand 10 such that the free ends of diverter arms 26 and 27 may extend over a portion of transition conveyor 25. Diverter arms 26 and 27 may be re-positioned manually (e.g., by a customer or store attendant) or may be coupled to a motorized component that is configured to re-position the diverter arms in response to an electronic signal. Such a signal may be generated by user input (e.g., depressing a button or switch) or may be automatically generated by a computer system that is programmed to re-position the diverter arms in response to one or more conditions or events, for example, the detection of items in certain locations at the checkstand. A person of skill in the art with the benefit of this disclosure will recognize other ways that diverter arms of the present invention may be mounted, positioned and/or re-positioned in order to direct items passing along a conveyor to a desired location in a checkstand.

As a person of skill in the art will recognize, the methods and systems of the present disclosure could be practiced with checkstands having only a single outtake conveyor and/or collection area, or with checkstands having more than two collection areas. In those embodiments, the checkstand may comprise a different number and/or configuration of diverter arms than those shown in FIG. 1.

In one embodiment, a first customer may itemize his order using the multi-item scanner 30 and his items can be moved onto outtake conveyor 29 and collection area 41 for bagging while the first customer's order is processed and completed and/or his items are bagged. During that time, a second customer may bring items that they desire to purchase to the same checkstand 10. Diverter arms 26 and 27 may be re-positioned (either manually or using an automated system) at the end of outtake conveyor 29 near transition conveyor 25 to prevent the second customer's items from passing to outtake conveyor 29 and instead allow those items to pass onto outtake conveyor 28 and collection area 40. This arrangement may increase the speed and/or efficiency of the checkout process, reduce inadvertent intermingling of items from different customers' orders, reduce the amount of space and/or equipment reserved for checkstands at a retail store, and/or provide other benefits.

In other embodiments, one or more diverter arms of the present invention may be used to direct the movement of items to different collection areas for other reasons. For example, the diverter arm may be positioned either manually or using an automated system to direct certain types of items (e.g., refrigerated or frozen items, raw meats, fresh produce, etc.) to one collection area, and re-positioned to direct other types of items to another collection area associated with the checkstand. This may be accomplished by moving the diverter arms manually or automatically (e.g., in response to the identification of certain types of items by a scanning device). This may, among other benefits, reduce cross-contamination of certain types items and/or facilitate the bagging of items with similar types of items (which may be more convenient for the customer in transporting and/or storing items).

2. Diverter Arm Design

Figure 2:
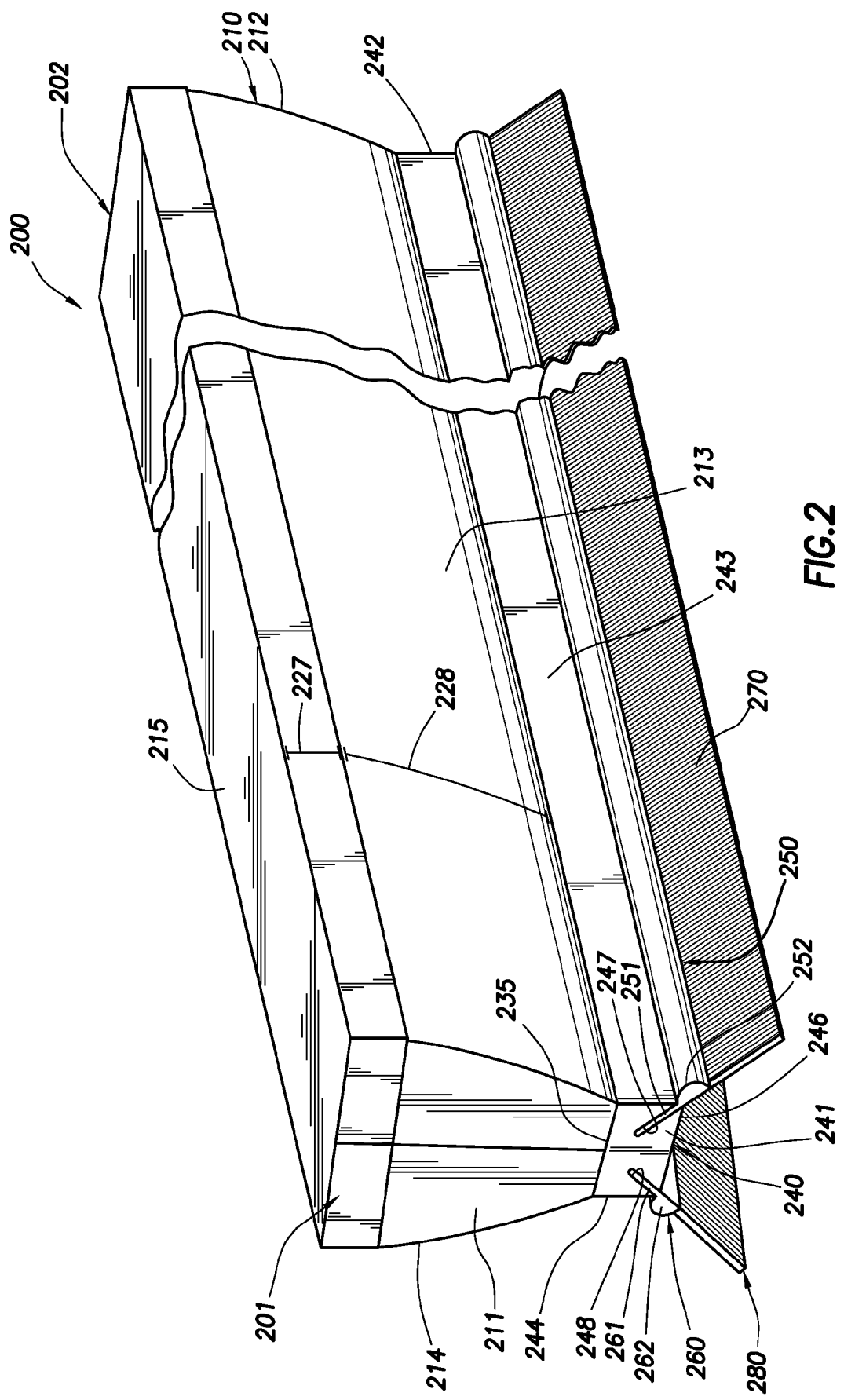
FIG. 2 depicts a perspective view of a diverter arm according to one embodiment of the present disclosure.

An example of a diverter arm 200 according to the present invention is shown in FIG. 2. Diverter arm 200 is an elongated structure having a proximal end 201 and a distal end 202. Diverter arm 200 includes an elongated block portion 240, an upper body portion 210 positioned on top of the block portion along its length, and two bristle portions that each include a bristle base 250 or 260 projecting downward from the bottom of the block portion along its length and a bristle 270 or 280 attached to the bristle base 250 or 260. The elongated block portion 240 includes a proximal face 241 and a distal face 242 at the proximal and distal ends 201 and 202 of the diverter arm 200, respectively, as well as a front face 243, a rear face 244, a top face 245, and a bottom face 246.

A diverter arm according to the present invention is generally an elongated structure. In many embodiments, the length of the diverter arm is greater than its width and/or height, although the exact dimensions may vary depending on the particular application and/or checkstand in which the diverter arm is used. For example, the length of the diverter arm may be at least as wide as the conveyor(s) across which the diverter arm is designed to extend. In some embodiments, the diverter arm of the present invention may be approximately 3 feet long. In checkstands of the present invention where more than one diverter arm is used, the diverter arms may have the same or different lengths.

Figure 5:
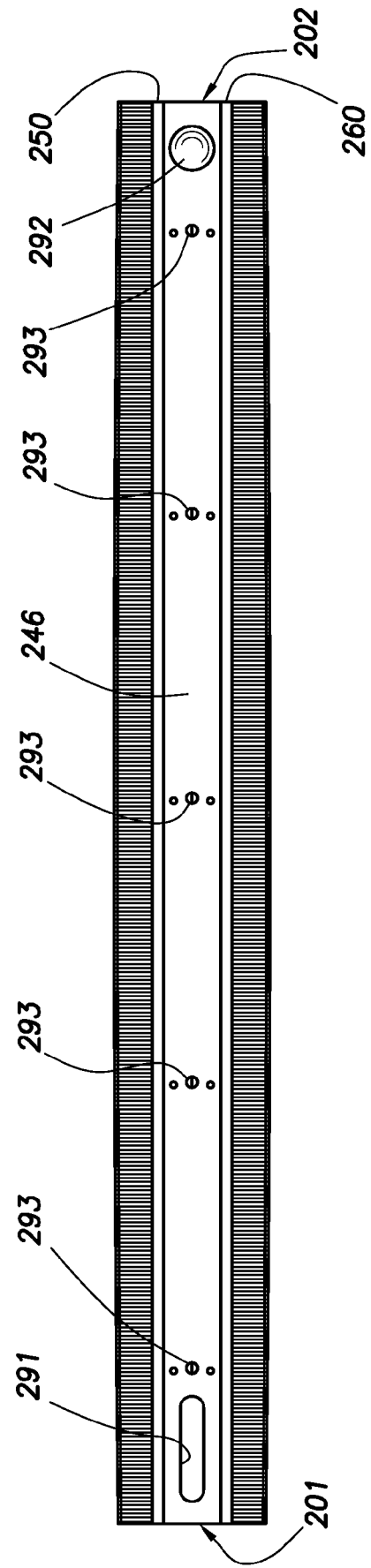
FIG. 5 depicts a bottom view of a diverter arm according to one embodiment of the present disclosure.

FIG. 5 shows a bottom view of the diverter arm 200 (looking up at the bottom face 246 of the block portion 240). In the embodiment shown, the proximal end 201 of diverter arm 200 may be pivotally mounted at a checkstand while the distal end 202 of diverter arm 200 is a "free end" that may extend over a portion of a conveyor at the checkstand. A cavity or recess 291 may be formed near the proximal end 201 in the block portion 240 to receive a boss, lug, shaft, or other structure at the checkstand to which the diverter arm 200 is mounted. Once the proximal end 201 is mounted, the diverter arm 200 may be pivoted about that end manually or automatically, for example, by energizing a motor operatively connected to the boss, lug, shaft, or other structure to which the diverter arm is attached. A ball bearing or caster 292 also may be positioned on the bottom of the block portion 240 near the distal end 202 of the diverter arm 200. The ball bearing or caster 292 may be positioned and sized so as to contact the top surface of the conveyor but allow the bottom face 246 of the block portion 240 and/or the bristles 270 and 280 to sit a certain distance above the conveyor. In some embodiments, a ball bearing caster may allow the bottom face of the block portion to sit about $1/16$ inches above the conveyor. This may, among other benefits, allow the diverter arm to remain stationary while the conveyor removes beneath it, allow the diverter arm to move more freely when it is intentionally re-positioned, and/or allow the bristles to sit on the top surface of the conveyor without exerting any downward force on the conveyor itself.

One or more bristle portions may be attached to the bottom of the block portion projecting downwardly in any configuration using any means known in the art. The bristles may be made of any suitable material known in the art, such as nylon or other synthetic materials. In some embodiments, the fibers of the bristle may be attached to a solid bristle base having a shape and/or comprising a material that may be easily mounted to the block portion of the diverter arm. For example, the bristle base may be constructed of plastic or a semi-rigid rubber. Referring back to FIG. 2, bristle bases 250 and 260 each include a flange portion 252 and 262 to which the bristles 270 and 280 are attached, and a rib 251 and 261 that is designed to fit into a groove or slot 247 or 248 in the bottom face 246 of the block portion 240. In the embodiment shown, the bristle bases 250 and 260 are mounted to the bottom corners of the block portion 240 such that the bristles 270 and 280 project downward at an angle approximately 45 degrees from vertical. Ribs 251 and 261 may be inserted into the grooves or slots 247 or 248 and attached there permanently or they may be removably mounted so that they may be removed and/or replaced, for example, if they have become worn or damaged after extended use. In some embodiments, ribs 251 and 261 may remain in place by "friction-fit". Referring now to FIG. 5, in the embodiment shown, screws 293 may retain the bristles and/or ribs 251 and 261 of the bristle bases 250 and 260 in position in the grooves or slots 247 and 248 in block portion 240. These screws 293 may be unscrewed to allow the bristles to be removed and/or replaced.

Referring back to FIG. 2, the upper body portion 210 of the diverter arm 200 may be attached or joined to the block portion 240 by any known means of joining the two structures. For example, the top face 245 of the block portion 240 may include one or more recesses or grooves along its length into which tabs or other structures on the bottom face 246 of the upper body portion 210 may slide or snap-fit. Such a configuration may, among other things, facilitate the replacement, repair, and/or cleaning of the upper body portion following extended use.

The upper body portion 210 includes a proximal face 211 and a distal face 212 at the proximal and distal ends 201 and 202 of the diverter arm 200, respectively, as well as a front face 213, a rear face 214, a top face 215, and a bottom face 246. In typical use of the diverter arms of the present invention, items passing along the conveyor will most often contact the front and/or rear faces 213 and 214 of the upper body portion 210. Thus, the upper body portion 210 (and specifically the front and rear faces 213 and 214) may have a shape designed to balance the impact of items on the diverter arm, effectively direct movement of items of different shapes and sizes, and reduce the impact of the diverter arm on soft or fragile items that may be squeezed or damaged. In the embodiment shown in FIG. 2, the front and/or rear faces 213 and 214 of the upper body portion 210 include a top section 227 and a bottom section 228. The top section 227 may be substantially vertical, while the bottom section 228 may be concave toward the bottom face 216 of the upper body portion 210 and the bottom face 246 and the block portion 240 are narrower than the top face 215 of the upper body portion. This shape may, among other benefits, prevent larger, taller items from contacting and/or damaging the bristles at the bottom of the diverter arm and/or prevent items from becoming wedged against the diverter arm.

Figure 4:
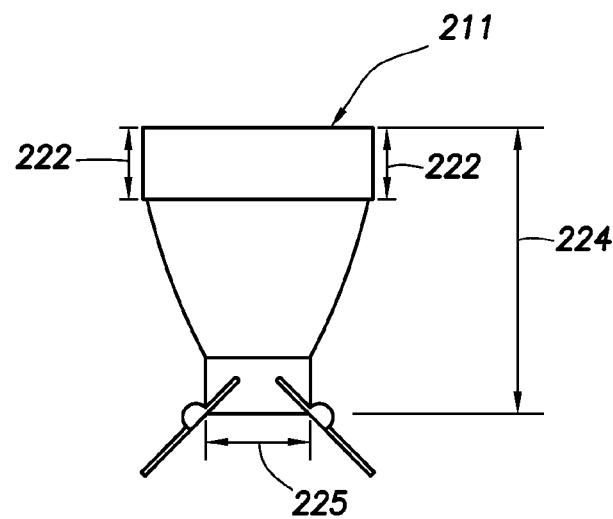
FIG. 4 depicts a side view of a diverter arm according to one embodiment of the present disclosure.

A side view of the diverter arm 200 (from the proximal end 201 of the diverter arm 200) is shown in FIG. 4. In some embodiments the width 225 of the bottom face 246 of the upper body portion 210 and the block portion 240 may be approximately 1-⅛ inches. In some embodiments, the heights 221 and 222 of the top section 227 of the front and/or rear faces 213 and 214 may be approximately 1 inch. Heights 221 and 222 may be the same or different depending on, among other things, the intended configuration and use of the diverter arm in a checkstand according to the present invention. In some embodiments, the combined vertical height 224 of the upper body portion 210 and the block portion 240 may be approximately 4-¼ inches.

Figure 3:
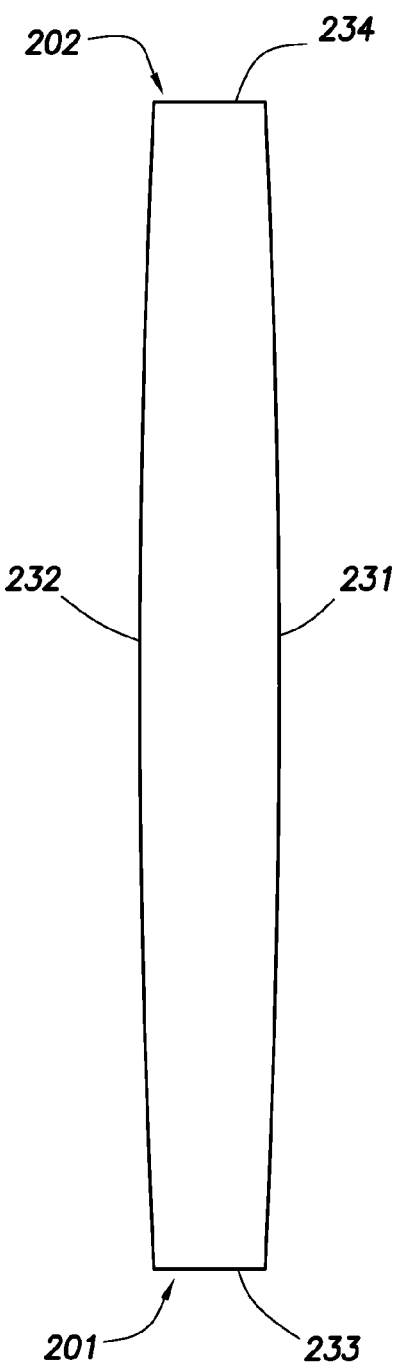
FIG. 3 depicts a top view of a diverter arm according to one embodiment of the present disclosure.

A top view of the diverter arm 200 (looking down on the top face 215 of the upper body portion 210) is shown in FIG. 3. The front and rear edges 231 and 232 of the top face 215 (corresponding to the front and rear faces 213 and 214 of the upper body portion 210) are curved such that the top portions 227 of the front and rear faces 213 and 214 are convex toward the center of the upper body portion. Moreover, the proximal edge 233 of the top face 215 may be wider than the distal edge 234 of the top face 215 such that the the upper body portion 210 is tapered to its distal end 202. For example, in some embodiments, the proximal edge 233 may be approximately 3 inches wide, while the distal edge 234 may be approximately 2 inches wide. This tapered shape may, among other things, force items contacting the diverter arm to travel toward its distal end and (when the diverter arm is correctly positioned) the selected collection area.

The block portion, upper body portion, and/or bristle base may be made of any suitable material known in the art, including but not limited to metals, cardboards, and plastics (e.g., polyurethane). These components may be formed as individual pieces that are assembled or attached to one another, or one of these components may be integrally molded or formed. Ball bearings and casters also may be made of any suitable material known in the art, including but not limited to metals and plastics.

While the particular embodiments disclosed herein describe the use of the diverter arm of the present invention in retail checkstands, diverter arms of the present invention also may be used in other systems and methods where items move along a conveyor and are directed to one or more collection areas, including but not limited to inventory and warehousing systems, manufacturing systems, packaging systems, and the like. Such systems and diverter arms are considered within the scope and spirit of the present invention provided that they otherwise satisfy the elements of the claims below.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A diverter arm comprising:
   an elongated block portion;
   an upper body portion positioned on top of the block portion substantially along its length, the upper body portion comprising at least a front face comprising a top section that is substantially vertical and a bottom section that is substantially concave toward the bottom of the upper body portion; and
   at least one bristle portion projecting downward from the bottom of the block portion substantially along its length.

2. The diverter arm of claim 1 wherein the top section has a height of approximately 1 inch.

3. The diverter arm of claim 1 wherein the front face of the upper body portion is substantially convex toward the center of the upper body portion.

4. The diverter arm of claim 1 having a proximal end and a distal end wherein the distal end of the upper body portion is narrower than the proximal end of the upper body portion.

5. The diverter arm of claim 1 further comprising a caster or ball bearing positioned on a bottom face of the block portion.

6. The diverter arm of claim 5 wherein the caster or ball bearing is at least partially positioned within a cavity formed in the bottom face of the block portion.

7. The diverter arm of claim 1 wherein at least one bristle portion comprises a bristle base attached to the block portion and a downward-projecting bristle attached to the bristle base.

8. A retail checkstand comprising:
   a conveyor configured to receive items;
   one or more item collection areas proximate to an end of the conveyor;
   one or more diverter arms positioned between a portion of the conveyor and one or more of the item collection areas, wherein the diverter arm comprises
   an elongated block portion,
   an upper body portion positioned on top of the block portion substantially along its length, the upper body portion comprising at least a front face, and
   at least one bristle portion projecting downward from the bottom of the block portion substantially along its length.

9. The retail checkstand of claim 8 wherein a proximal end of one or more of the diverter arms is pivotally mounted at the checkstand and each of the one or more diverter arms extends over at least a portion of the conveyor.

10. The retail checkstand of claim 8 wherein the front face of the upper body portion of one or more of the diverter arms comprises
a top section that is substantially vertical; and
a bottom section that is substantially concave toward the bottom of the upper body portion.

11. The retail checkstand of claim 8 wherein the front face of the upper body portion of one or more of the diverter arms is substantially convex toward the center of the upper body portion.

12. The retail checkstand of claim 8 wherein one or more of the diverter arms comprises a proximal end and a distal end wherein the distal end of the upper body portion is narrower than the proximal end of the upper body portion.

13. The retail checkstand of claim 8 wherein one or more of the diverter arms further comprises a caster or ball bearing positioned on a bottom face of the block portion.

14. The retail checkstand of claim 8 wherein at least one bristle portion of one or more of the diverter arms comprises a bristle base attached to the block portion and a downward-projecting bristle attached to the bristle base.

15. A method of performing retail checkout comprising:
providing a retail checkstand comprising
a conveyor configured to receive items;
at least first and second item collection areas proximate to an end of the conveyor;
one or more diverter arms positioned between a portion of the conveyor and one or more of the item collection areas, wherein the diverter arm comprises
an elongated block portion,
an upper body portion positioned on top of the block portion substantially along its length, the upper body portion comprising at least a front face, and
at least one bristle portion projecting downward from the bottom of the block portion substantially along its length;
positioning one or more of the diverter arms in a first position in which items are permitted to pass from the conveyor to a first collection area but not to a second collection area; and
positioning one or more of the diverter arms in a second position in which items are permitted to pass from the conveyor to the second collection area but not to the first collection area.

16. The method of claim 15 wherein the front face of the upper body portion of one or more of the diverter arms comprises
a top section that is substantially vertical; and
a bottom section that is substantially concave toward the bottom of the upper body portion.

17. The method of claim 15 wherein the front face of the upper body portion of one or more of the diverter arms is substantially convex toward the center of the upper body portion.

18. The method of claim 15 wherein one or more of the diverter arms comprises a proximal end and a distal end wherein the distal end of the upper body portion is narrower than the proximal end of the upper body portion.

19. The method of claim 15 wherein one or more of the diverter arms further comprises a caster or ball bearing positioned on a bottom face of the block portion.

20. A diverter arm comprising:
an elongated block portion;
an upper body portion positioned on top of the block portion substantially along its length, the upper body portion comprising at least a front face that is substantially convex toward the center of the upper body portion; and
at least one bristle portion projecting downward from the bottom of the block portion substantially along its length.

21. The diverter arm of claim 20 wherein the front face of the upper body portion comprises
a top section that is substantially vertical; and
a bottom section that is substantially concave toward the bottom of the upper body portion.

22. The diverter arm of claim 21 wherein the top section has a height of approximately 1 inch.

23. The diverter arm of claim 20 having a proximal end and a distal end wherein the distal end of the upper body portion is narrower than the proximal end of the upper body portion.

24. The diverter arm of claim 20 further comprising a caster or ball bearing positioned on a bottom face of the block portion.

25. The diverter arm of claim 24 wherein the caster or ball bearing is at least partially positioned within a cavity formed in the bottom face of the block portion.

26. The diverter arm of claim 20 wherein at least one bristle portion comprises a bristle base attached to the block portion and a downward-projecting bristle attached to the bristle base.

* * * * *